Patented Oct. 28, 1952

2,615,930

UNITED STATES PATENT OFFICE 2,615,930

METHOD OF MAKING POSITIVE ELECTRODES FOR BATTERY CELLS

Joseph Donald Moulton, West Orange, and Robert F. Enters, Hackensack, N. J., assignors to Thomas A. Edison, Incorporated, West Orange, N. J., a corporation of New Jersey No Drawing. Original application December 13, 1945, Serial No. 634,822, now Patent No. 2,561,943, dated July 24, 1951. Divided and this application July 28, 1950, Serial No. 176,544

3 Claims. (Cl. 136—20)

This application is a division of the pending United States Patent application Serial No. 634,822 on "Electric Batteries" filed December 13, 1945, now U. S. Patent 2,561,943 granted July 24, 1951.

This invention relates to improvements in the method of making a positive electrode for a battery cell in which the active ingredient for the electrode is silver peroxide.

Objects of the invention are to provide an improved, and improvements in a, method of making such electrode, which is simpler and more economical to carry out than the methods heretofore known, and which is carried out without introducing during any step of the method any element which must be removed to produce the desired final product.

Still further objects are to provide an improved positive electrode using silver peroxide as the active ingredient, which can be discharged at very high currents per unit of weight and volume of the electrode and which will reach its full discharge rate almost instantly.

These and other objects and features of our invention will be more fully apparent from the following description and the appended claims.

The positive electrodes of the present invention are in the following description more particularly referred to as "plates" in view of the preferred plate-like form thereof. Such plate of the present invention comprises a framework preferably in the form of a wire gauze grid to support the active material and to conduct the electric current therefrom. The gauze is preferably made of copper wire coated electrolytically with nickel. By way of example, a gauze 45 x 45 mesh woven of .0065" copper wire is very suitable. The amount of nickel coating on the gauze is rather critical. For the particular gauze just mentioned, the amount of nickel should be kept between .021 and .065 gram per square inch of the gauze. A thickness of about .002" is satisfactory. If less nickel than the minimum stated is used, the nickel is likely to alloy with the copper during the sintering process hereinafter described, with the result that the nickel will fail to protect the copper against corrosion in a reoxidizing operation which is also subsequently described. If the nickel plating is thicker than the maximum stated, there is a possibility that the discharge voltages will be lowered due to the higher resistance of nickel.

The nickel-plated gauze is next pressed between platens to reduce its thickness to about .007" to .009", which is a reduction of the order of two-thirds of the original thickness. The compression, of course, affects mainly the points where the wires of the gauze are crossed. After this pressing operation, the gauze is loaded with silver oxide ($Ag_2O$). A loading weight of $Ag_2O$ equivalent to .395 gram of silver per square inch of plate area gives satisfactory results. The plate area may typically be approximately 38 square inches, say 6⅛" x 6⅜". In loading this positive plate, silver oxide powder is mixed with sufficient water to produce a paste which can be applied to the gauze by a spatula or by any other suitable means. After the paste is applied, the plate is given a preliminary drying in an oven at approximately 85° C. for approximately fifteen minutes. Next, the plate is sintered preferably in a muffle furnace at 450° to 480° C. for about ten minutes. The preliminary drying may be varied as, for example, at a lower temperature for a longer time. The sintering may also be varied, as temperatures up to 600° C. may be employed, but the temperature should not exceed 480° C. if the nickel plating on the copper gauze is near the above mentioned minimum of .021 gram per square inch. After the sintering operation is completed, the active material, which is now all metallic silver, amounts to about 14 to 18 grams for the plate area of 38 square inches.

The sintered plates are then pressed between flat-faced platens with a force of about 23 tons, which is a pressure of the order of .6 ton per square inch of plate area. This compression densifies the silver and develops satisfactory electrical characteristics in it, while maintaining a part of the porosity which the silver had before the pressing operation. If the pressure is too high, the porosity of the silver will be destroyed and a reoxidizing operation hereinafter mentioned will be handicapped or possibly made completely ineffective. One effect of the pressing operation is that in densifying the silver the same is forced into intimate contact with the wire gauze so that the gauze affords a firm support for the silver.

The metallic silver is next converted into a peroxide of silver. This is accomplished by electrolyzing the silver plates anodically in a 5% KOH solution against an inert cathode, say one of nickel steel, for about sixteen hours at 1 ampere per plate. Concentration of the KOH solution may vary from 5% to 25% and the electrolization may otherwise vary. For example, it may continue for three hours at 6 amperes per plate.

After the plate has been electrolyzed as described, substantially all the metallic silver will have been converted into silver peroxide ($Ag_2O_2$). The plate is then washed in running water, care being used not to continue washing too long for fear of leaving a calcium or magnesium deposit on the plate, either of which would be injurious to the battery cell when the cell is discharged. After this washing operation, the plates are then dried and set aside until needed.

The present positive plate may, by way of illustration, be used with a zinc negative electrode in a caustic alkali electrolyte as of potassium hydroxide. The reactions may be written thus: The cell reaction is $$Ag_2O_2 + 4KOH + 2Zn \rightarrow 2Ag + 2K_2ZnO_2 + 2H_2O$$

the reactions at the positive electrode are (1) 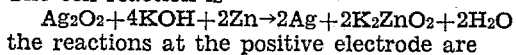

(2) 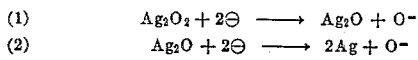

Because of the relatively thin plate construction, these reactions proceed very rapidly to permit a high rate of current discharge; also, the reactions proceed nearly to completion giving good utilization of active material in spite of the extremely high rate of current discharge.

A particular advantage in our above described method is that at no point in the process do we use any ingredient other than silver or silver oxide, the ingredients desired in the final product. Thus, the number of steps in the process are reduced since we do not have to perform additional steps to remove any undesired or contaminating elements. Also, we are assured of obtaining an active material which is absolutely pure.

A further particular novel feature in our process is in compressing the sintered pure elemental silver into the gauze framework just preceding the anodic electrolyzing step in which the silver is converted to silver peroxide.

The embodiment of our invention hereinabove described is intended to be illustrative and not limitative of our invention since the same is subject to modifications within the scope of our invention, which we endeavor to express according to the following claims.

We claim:

1. The method of making a positive plate for use in a battery cell which includes applying a paste of silver oxide and water to a metallic gauze plate, heating to decompose said oxide wherefore to leave a coating of metallic silver on said plate, pressing the plate to densify the silver and force it into firm engagement with the grid while maintaining a part of its porosity, and electrolyzing the silver as anode in an alkali solution against an inert cathode to convert substantially all of the metallic silver into $Ag_2O_2$ tightly adhering to the grid.

2. The method of making a positive plate for use in a battery cell which includes applying to a metallic wire gauze grid, having a substantially uniform thickness a paste consisting of silver oxide and water, drying the pasted grid, sintering the dried paste at between about 300° and about 600° C. to reduce the oxide to porous metallic silver, compressing the sintered plate sufficiently to densify the silver while maintaining a part of its porosity, electrolyzing the silver as anode against an inert cathode in an alkali solution until substantially all of the metallic silver is converted into $Ag_2O_2$, and then washing and drying the plate.

3. The method of making a positive plate for use in a battery cell comprising electroplating a gauze of approximately 45 mesh woven of approximately .0065" wire with nickel in the amount between .021 and .065 gram per square inch of plate area, compressing the nickel-plated gauze to approximately two-thirds its original thickness, covering said gauze with a paste of silver oxide powder and water in an amount by weight equivalent to approximately .395 gram of silver per square inch of plate area, drying and then sintering the plate to reduce the silver oxide to porous metallic silver, compressing the plate between flat platens at a pressure of approximately .6 ton per square inch, and anodically electrolyzing the plate in an alkali solution to convert the metallic silver to silver peroxide.

JOSEPH DONALD MOULTON.
ROBERT F. ENTERS.

REFERENCES CITED

The following references are of record in the file of this patent:

UNITED STATES PATENTS

| Number | Name | Date |
|---|---|---|
| 26,978 | Edwards | Jan. 31, 1860 |
| 692,298 | Jungner | Feb. 4, 1902 |
| 975,980 | Morrison | Nov. 15, 1910 |

OTHER REFERENCES

Systematic Inorganic Chemistry, by R. M. Caven and G. D. Lander, pub. by Blackie and Son, Ltd., London, 1932, page 106.